(12) United States Patent
Karay (10) Patent No.: US 9,726,130 B2
(45) Date of Patent: Aug. 8, 2017

(54) FUEL INJECTION ASSEMBLY

(75) Inventor: Steve Karay, Scarborough (AU)

(73) Assignee: Orbital Australia Pty Ltd, Balcatta (AU)

( * ) Notice: Subject to any disclaimer, the term of this patent is extended or adjusted under 35 U.S.C. 154(b) by 1181 days.

(21) Appl. No.: 13/807,034

(22) PCT Filed: Jun. 30, 2011

(86) PCT No.: PCT/AU2011/000809

§ 371 (c)(1),
(2), (4) Date: Jan. 25, 2013

(87) PCT Pub. No.: WO2012/000038

PCT Pub. Date: Jan. 5, 2012

(65) Prior Publication Data

US 2013/0233279 A1    Sep. 12, 2013

(30) Foreign Application Priority Data

Jun. 30, 2010    (AU) ................................ 2010902904

(51) Int. Cl.

| F02M 61/00 | (2006.01) |
| F02M 61/14 | (2006.01) |
| F02M 21/02 | (2006.01) |
| F02M 55/00 | (2006.01) |
| F02M 55/02 | (2006.01) |

(52) U.S. Cl.
CPC ........ *F02M 61/14* (2013.01); *F02M 21/0266* (2013.01); *F02M 21/0281* (2013.01); *F02M 55/005* (2013.01); *F02M 21/0212* (2013.01); *F02M 21/0215* (2013.01); *F02M 55/025* (2013.01); *F02M 2200/851* (2013.01); *F02M 2200/856* (2013.01); *Y02T 10/32* (2013.01)

(58) Field of Classification Search
CPC ............... F02M 61/14; F02M 21/0281; F02M 21/0266; F02M 21/0215; F02M 21/0212; F02M 55/005; F02M 55/025; F02M 2200/851; Y02T 10/32
See application file for complete search history.

(56) References Cited

U.S. PATENT DOCUMENTS

| 3,325,104 A | 6/1967 | Roosa |
| 5,058,555 A * | 10/1991 | Haboush, II ......... F02M 69/465 123/456 |
| 5,070,844 A * | 12/1991 | Daly .................... F02M 51/005 123/456 |

(Continued)

OTHER PUBLICATIONS

International Search Report and Written Opinion for PCT/AU2011/000809, mailed Mar. 21, 2012; ISA/AU.

*Primary Examiner* — Hieu T Vo
*Assistant Examiner* — Sherman Manley
(74) *Attorney, Agent, or Firm* — Harness, Dickey & Pierce, P.L.C.

(57) ABSTRACT

A fuel injection assembly comprising a fuel injector (19) having an injection outlet (19) and a fuel rail (17) in which the fuel injector is adapted to be supported. The fuel injector (19) has a tip (37) having an end from which fuel issuing from the outlet of the fuel injector is discharged. The tip (37) is adapted for location in an injection port (21), the tip being of flexible construction to accommodate some misalignment between the fuel rail (17) and the injection port (21).

22 Claims, 5 Drawing Sheets

(56) References Cited

U.S. PATENT DOCUMENTS

| | | | |
|---|---|---|---|
| 5,680,845 A | 10/1997 | Peng | |
| 5,752,486 A * | 5/1998 | Nakashima | F02M 47/027 123/447 |
| 6,260,537 B1 * | 7/2001 | Lamb | F02M 35/10078 123/456 |
| 6,418,911 B1 * | 7/2002 | Augustin | F02M 57/025 123/456 |
| 6,431,151 B1 * | 8/2002 | Gmelin | F02M 61/14 123/468 |
| 6,543,421 B2 | 4/2003 | Lorraine et al. | |
| 7,086,385 B2 | 8/2006 | Imoehl | |
| 7,334,571 B1 * | 2/2008 | Beardmore | F02M 61/14 123/456 |
| 7,350,507 B2 | 4/2008 | Yahara | |
| 7,444,992 B2 * | 11/2008 | Ricci | F02M 61/14 123/470 |
| 7,976,073 B2 * | 7/2011 | Mannucci | F02M 55/004 123/470 |
| 8,069,842 B2 * | 12/2011 | Kannan | F02M 55/004 123/470 |
| 8,353,272 B2 * | 1/2013 | Scheffel | F02M 61/14 123/470 |
| 2002/0157648 A1 * | 10/2002 | Reiter | F02M 61/14 123/470 |
| 2004/0232259 A1 * | 11/2004 | Kienzler | F02M 61/167 239/533.2 |
| 2005/0178859 A1 | 8/2005 | Sako | |
| 2006/0243254 A1 * | 11/2006 | Yahara | F02M 61/14 123/470 |
| 2009/0023043 A1 * | 1/2009 | Takahashi | H01M 8/04186 429/421 |
| 2011/0232608 A1 * | 9/2011 | Ramamurthy | F16F 15/02 123/470 |
| 2013/0333669 A1 * | 12/2013 | Kromer | F02M 55/005 123/456 |

* cited by examiner

FUEL INJECTION ASSEMBLY

CROSS-REFERENCE TO RELATED APPLICATIONS

This application is a 371 U.S. National Stage of International Application No. PCT/AU2011/000809, filed Jun. 30, 2011, and claims priority to Australian patent application No. 2010902904 filed Jun. 30, 2010, the disclosures of which are herein incorporated by reference in their entirety.

FIELD OF THE INVENTION

The present invention relates to injection of fuels in internal combustion engines. In particular, the invention is concerned with a fuel injection assembly for injection of fuels in internal combustion engines.

The term "gaseous fuels" as used herein refers to compressed gas fuels such as compressed natural gas (CNG) and hydrogen ($H_2$), and liquefied gaseous fuels such as liquefied petroleum gas (LPG) and liquefied natural gas (LNG).

BACKGROUND ART

The following discussion of the background art is intended to facilitate an understanding of the present invention only. The discussion is not an acknowledgement or admission that any of the material referred to is or was part of the common general knowledge as at the priority date of the application.

In multi-cylinder engines for which a plurality of fuel injectors are required, it is common to use a fuel rail assembly to supply fuel to the fuel injectors. Typically, the fuel rail assembly comprises a rigid fuel rail, which comprises a manifold adapted for connection to a fuel supply, and a plurality of fuel injectors rigidly connected to the fuel rail. With this arrangement, the fuel rail provides a mounting for the fuel injectors and supplies fuel to the injectors.

For indirect or manifold injection applications, the fuel injectors deliver fuel at some point before the intake valve, typically into an inlet manifold. With this delivery arrangement, the fuel injectors typically communicate with injection ports in the inlet manifold.

There is a need for the location of the fuel injectors in a fuel rail assembly to match the spacing and orientation between injection ports. Unless there is precision in the positioning of the fuel injectors in the fuel rail assembly, there can be misalignment between at least some of the extensions on the fuel injectors and the injection ports into which the extensions need to locate. Any such misalignment can present a difficulty to the installation and sealing of the fuel injector assembly on an engine.

The invention is particularly applicable to liquid phase injection (LPI) of gaseous fuels such as LPG, and in particular to LPI systems for multi-cylinder engines.

For the LPI process it is necessary to deliver liquefied gaseous fuel to a fuel injector in the liquid phase. The requirement to maintain the liquid phase of the liquefied gaseous fuel necessitates that the fuel be maintained under pressure.

During the delivery process there is a phase change at the outlet of the injector, which can lead to rapid cooling and, consequently, formation of ice on the tip of the injector nozzle. The formation of ice on the injector nozzle is disadvantageous as it can lead to deterioration in the performance of the nozzle.

There have been various strategies proposed to address the issue of icing of an injector nozzle.

For indirect injection applications, one known strategy involves configuring the fuel injector as an injector body and a nozzle portion, with the nozzle portion providing an extension from the nozzle body to terminate at the nozzle tip. The extension is adapted to be received in an injection socket which is typically an intake manifold injector bore. The extension defines a delivery path which extends from a receiving chamber within the injector body and along which the gaseous fuel can be conveyed to the nozzle tip for delivery into the injection socket.

The extension comprises an inner tube defining the fuel delivery path terminating at the nozzle tip and a casing surrounding the inner tube, the casing presenting an end face at the tip of the nozzle portion.

The extension provides the tip of the nozzle and is adapted to provide thermal insulation to prevent heat loss during passage of the liquefied gaseous fuel to the outlet. Further, the extension is adapted to collect heat from the engine, thereby contributing to a reduction in thermal losses during passage of the liquefied gaseous fuel to the outlet. Additionally, heat so collected may assist in the reduction of icing at the nozzle outlet.

Typically, for LPI indirect injection applications, side feed fuel injectors are used.

It is against this background, and the problems and difficulties associated therewith, that the present invention has been developed.

DISCLOSURE OF THE INVENTION

According to a first aspect of the invention there is provided a fuel injection assembly comprising a fuel injector having an injection outlet, a mount in which the fuel injector is adapted to be supported, and a tip having an end from which fuel issuing from the outlet of the fuel injector is discharged, the tip being adapted for location in an injection port, the tip being of flexible construction to accommodate some misalignment between the mount and the injection port.

The mount may support a single fuel injector or a plurality of fuel injectors disposed in spaced relation.

Where the mount supports a plurality of fuel injectors in spaced relation it may be configured as a fuel rail.

The flexible construction of the tip may be provided in any appropriate way. The tip may be formed of a pliant material, or it may be of articular construction, or both formed of a pliant material and of articular construction.

The articular construction may comprise a joint between the tip and a part of the fuel assembly to which it is connected. The articular construction may alternatively, or additionally, comprise a joint within the tip to permit articulation thereof.

In one arrangement, the fuel injector, or each fuel injector, may comprise a body portion and a nozzle portion, wherein the nozzle portion is configured as an extension to define the tip. With such an arrangement, the tip defined by the nozzle portion may be coupled to the body portion by a flexible joint.

The nozzle portion may comprise an inner tube defining a fuel flow path and a casing surrounding the inner tube. The casing may be configured as an outer tube surrounding the inner tube. With this arrangement, the inner and outer tubes provide a tube assembly.

The tube assembly may be coupled to the injector body by way of the flexible joint.

In another arrangement, the tip may be formed integrally with, or connected to, the fuel rail.

In the arrangement where the tube assembly is, coupled to the injector body by way of the flexible joint, the flexible joint may comprise an inner end portion of the outer tube configured as a ferrule for engagement with a hub on the injector body portion and also for engagement with an injection port in which the fuel injector is adapted to be received.

Preferably, the ferrule has a circumferential side wall which defines a cavity to receive the hub and a circumferential shoulder for location on a circumferential landing defined by the injection port, the ferrule being adapted to interact with the hub and the circumferential landing in a manner facilitating the angular swinging movement of the tube assembly.

Preferably, the flexible joint further comprises a first seal between the circumferential side wall of the ferrule and the hub. This provides sealing against external leakage of fuel and fuel vapours.

Preferably, the ferrule defines an inner cavity and the inner tube extends through the cavity for fluid communication with the hub to receive fuel therefrom, and a second seal within the cavity about the adjacent end section of the inner tube, the seal being adapted for sealing engagement with the adjacent end section of the inner tube, the ferrule and the hub.

In addition to sealing against leakage of fuel and fuel vapours, the second seal serves to prevent contact between the adjacent end section of the inner tube which locates against the hub and the surrounding outer tube. This is advantageous as the outer tube is typically of metallic material and contact with such material could lead to undesirable heat transfer.

The second seal may be of any appropriate configuration. In one arrangement, the second seal may be configured to define a plurality of dedicated sealing surfaces. In another arrangement the second seal may be configured as an O-ring. In yet another arrangement, the second seal may be configured as an X-ring. In still yet another arrangement, the second seal may comprise a plurality of sealing elements adapted to cooperate to provide a seal assembly which functions as the second seal. The sealing element may be of any appropriate configuration such a O-rings.

According to a second aspect of the invention there is provided a fuel injector for a fuel injection assembly according to the first aspect of the invention.

According to a third aspect of the invention there is provided a fuel injector having an injection outlet and a tip having an end from which fuel issuing from the outlet of the fuel injector is discharged, the tip being adapted for location in an injection port, the tip being of flexible construction to accommodate some misalignment between a mount in which the fuel injector is supported and an injection port into which the tip is adapted to be sealingly located.

According to a fourth aspect of the invention there is provided a fuel injector comprising a body portion and a nozzle portion configured to define a tip having an end from which fuel is discharged, the tip being adapted for location in an injection port, the tip being of flexible construction to accommodate some misalignment between a mount in which the fuel injector is supported and injection port into which the tip is adapted to be sealingly located.

The flexible construction of the tip may be provided in any appropriate way. The tip may be formed of a pliant material, or it may be of articular construction, or both formed of a pliant material and of articular construction.

The articular construction may comprise a joint between the tip and a part of the fuel assembly to which it is connected. The articular construction may alternatively, or additionally, comprise a joint within the tip to permit articulation thereof.

The tip defined by the nozzle portion may be coupled to the body portion by a flexible joint. Preferably, the fuel injector is configured as a side feed injector.

According to a fifth aspect of the invention there is provided a system for liquid phase injection (LPI) of gaseous fuels into a multi-cylinder internal combustion engine, the system comprising a fuel injection assembly according to the first aspect of the invention.

Preferably, the system is configured for delivery of LPG to fuel the engine.

BRIEF DESCRIPTION OF THE DRAWINGS

The invention will be better understood by reference to the following description of several specific embodiments as shown in the accompanying drawings in which.

BEST MODE(S) FOR CARRYING OUT THE INVENTION

Figure 1:
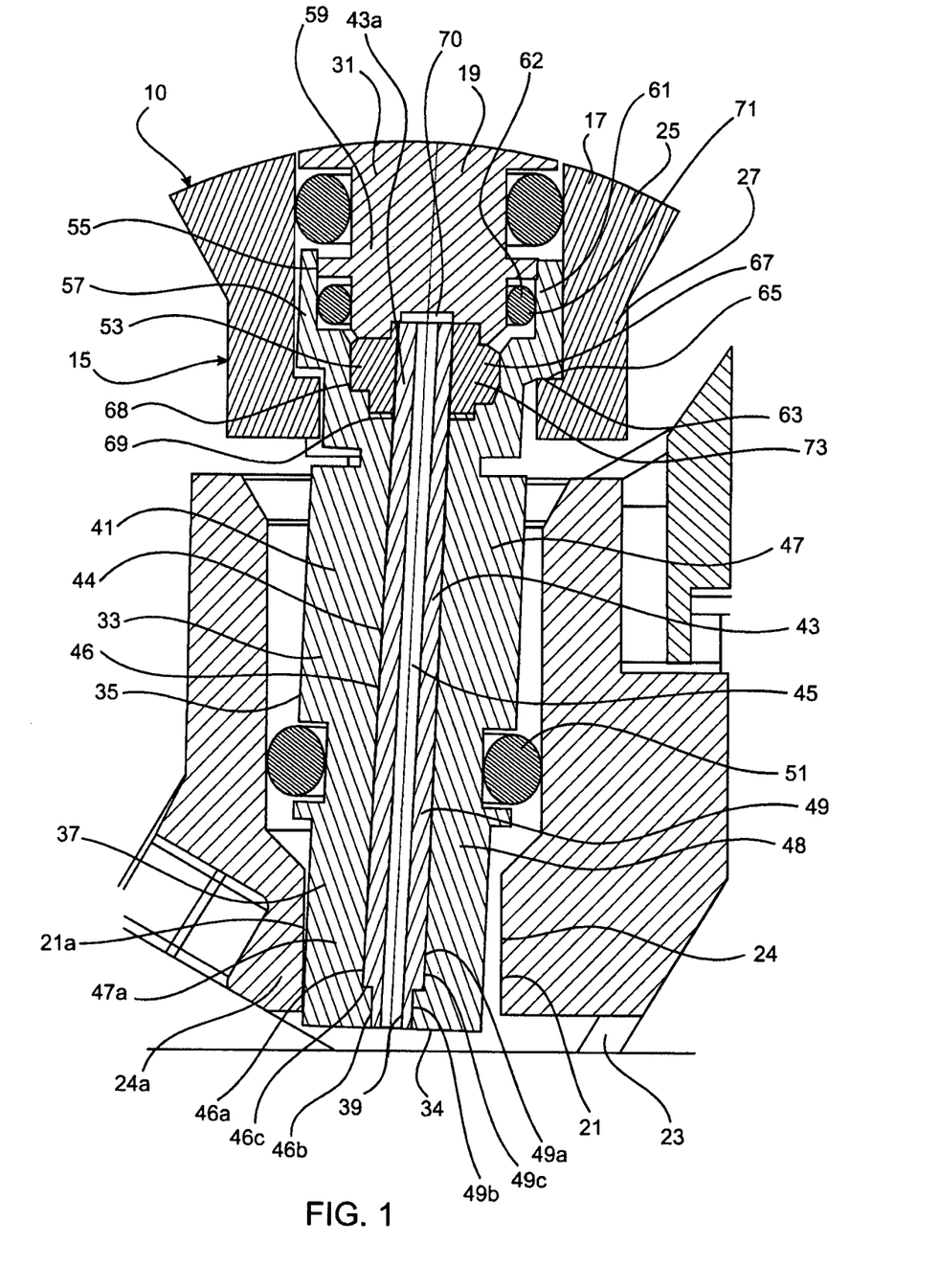
FIG. 1 is a schematic view of an injection system according to a first embodiment.
Figure 2:
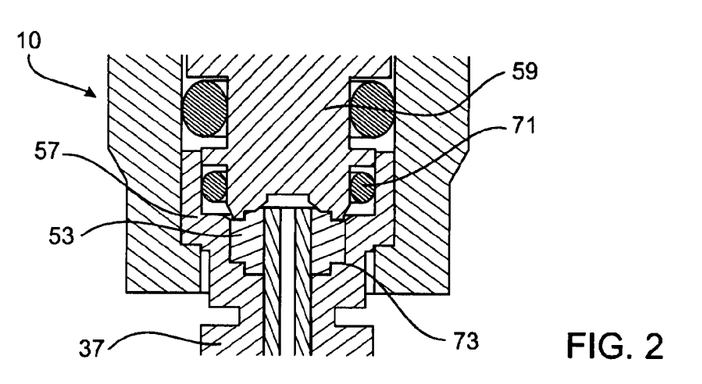
FIG. 2 is a further schematic view of an injection system according to the first embodiment.

The first embodiment, which is shown in FIGS. 1 and 2, is directed a system 10 for liquid phase injection (LPI) of gaseous fuels such as LPG for a multi-cylinder internal combustion engine.

The LPI system 10 comprises a fuel injection assembly comprising a fuel rail assembly 15 having a fuel rail 17, which is adapted for connection to a supply of the liquefied gaseous fuel under pressure, and a plurality of fuel injectors 19 connected to the fuel rail. Only one fuel injector 19 is shown in FIGS. 1 and 2.

In the arrangement illustrated, the LPI system 10 is configured for indirect injection of fuel to the combustion chambers of an engine. With this delivery arrangement, the fuel injectors 19 communicate with injection ports 21 defined by corresponding intake manifold injection bores or sockets. In this way, the fuel injectors 19 each communicate with some point before an intake valve for a respective combustion chamber, typically via a corresponding inlet runner 23 of an inlet manifold communicating with each of the combustion chambers of the multi-cylinder engine through corresponding inlet valves. Only one injection port 21 and inlet runner 23 are shown in FIG. 1.

The fuel rail 17 comprises a manifold 25 and a plurality of sockets 27 configured to receive and support the fuel injectors 19 (only one of which is shown in FIG. 1). With this arrangement, the fuel rail 17 is adapted to receive a supply of liquefied gaseous fuel in the liquid phase from a source (such as a pressurized tank or other reservoir) and distribute the liquefied gaseous fuel to the fuel injectors 19 for delivery via the injection ports 21 into the corresponding inlet runners 23.

Each fuel injector 19 is configured as a side feed injector and comprises a body portion 31 and a nozzle portion 33. The nozzle portion 33 is configured as an extension 35 to define a tip 37. The nozzle portion 33 defines an outlet 39 at the end of the tip 37 from which the liquefied gaseous fuel is delivered directly into the respective inlet runner 23. During the delivery process there is a phase change at outlet 39 which can lead to rapid cooling and, consequently, formation of ice on the injector tip 37. Ice formation on the injector tip 37 is disadvantageous as it can lead to deterioration in the performance of the fuel injector 19.

The nozzle portion 33 comprises a tube assembly 41 having an inner tube 43 defining a fuel flow path 45 which terminates at the outlet 39, and an outer tube 47 surrounding the inner tube 43 and defining the end 34 of the nozzle portion 33.

The tube assembly 41 is adapted to provide internal thermal insulation to prevent heat transfer during passage of the liquefied gaseous fuel along the fuel flow path 45 to the outlet 39. Further, the tube assembly 41 is adapted to collect heat from the surrounding engine environment, thereby contributing to a thermal gradient between the injector tip 37 and passage of the liquefied gaseous fuel along the fuel flow path 45 to the outlet 39. The heat so collected may also assist in the reduction of ice formation on the injector tip 37.

Specifically, the inner tube 43 is formed of a thermally insulating material to inhibit heat transfer to the liquefied gaseous fuel along the fuel flow path 45 to the outlet 39. In this embodiment, the inner tube 43 comprises a Teflon tube, although any other appropriate thermally insulating material may, of course, be used. Further the outer tube 47 is formed of a thermally conductive material for thermal collection. Typically, the outer tube 47 is formed of metal, although any other appropriate thermally conductive material may, of course, be used.

In the arrangement illustrated, the outer tube 47 comprises a cylindrical body 48 having an axial passage 49 in which the inner tube 43 is adapted to be received. The axial passage 49 comprises a first passage section 49*a* and a second passage section 49*b*, with the second passage section 49*b* opening onto the end 34. The first passage section 49*a* is of slightly larger diameter than the second passage section 49*b* whereby an annular ledge 49*c* is defined at the junction therebetween.

The inner tube 43 comprises a tubular body 44 having a central bore which defines the fuel flow path 45 and a cylindrical outer wall 46. The outer wall 46 comprises a first wall section 46*a* and a second wall section 46*b*, with the second wall section 46*b* being adjacent the end defining the outlet 39. The first wall section 46*a* is of slightly larger diameter than the second wall section 46*b* whereby an annular shoulder 46*c* is defined at the junction therebetween.

With this arrangement, the inner tube 43 is adapted to be received within the outer tube 47, with the shoulder 46*c* of the inner tube abutting the ledge 49*c* within the outer tube, as showing in the drawings. The second wall section 46*b* of the inner tube 43 defines a tip which is located in the second passage section 49*b*.

The location of the inner tube 43 within the outer tube 47 is determined by the annular shoulder 46*c* of the inner tube seating on the annular ledge 49*c* within the outer tube 47.

The outer tube 47 is sealing received in the injection port 21 through which the respective fuel injector 19 delivers fuel, the arrangement being such that the free end section 47*a* of the outer tube 47 can locate in close proximity to the inner end section 21*a* of the injection port 21 (as shown in FIG. 1) to receive heat from the engine environment, including in particular the intake manifold. The free end section 47*a* is configured to optimise positioning within the injection port 21 for heat transfer.

Sealing between the outer tube 47 and the injection port 21 is effected by a seal 51 which in this embodiment is configured as an O-ring seal.

The tube assembly 41 is coupled to the injector body portion 31 by way of a flexible joint 53. The flexible joint 53 permits articular movement between the tube assembly 41 and the body portion 31. This arrangement serves to accommodate any misalignment which may occur between the fuel injectors 19 mounted on the fuel rail 17 and the injection ports 21. Typically, the extent of any such misalignment is likely to be within the extent that can be accommodated by the available articular movement of the respective tube assemblies 41.

In this embodiment, the articular movement comprises limited angular swinging movement of the tube assembly 41 relative to the body portion 31 about the flexible joint 53.

In the arrangement illustrated, the flexible joint 53 comprises an inner end portion 55 of the outer tube 47 configured as a ferrule 57 for engagement with a hub 59 on the injector body portion 31 and also for engagement with the socket 27 of the fuel rail 17 in which the fuel injector 19 is received.

The ferrule 57 has a circumferential side wall 61 which defines a cavity 62 in which the hub 59 is received, and a circumferential shoulder 63 for location on a circumferential landing 65 defined by the socket 27 of the fuel rail 17.

The ferrule 57 also defines an inner cavity 67 disposed about the adjacent end of the inner tube 43. The inner cavity 67 has a cavity side wall 68 and a cavity inner wall 69.

The inner tube 43 extends through the cavity 67 and locates against the hub 59 on the injector body portion 31 for location in, and fluid communication with, a recess 70 in the hub. The fuel flow path 45 defined by the inner tube 43 receives liquefied gaseous fuel via the recess 70.

The ferrule 57 interacts with the hub 59 and the circumferential landing 65 in a manner which facilitates the angular swinging movement of the tube assembly 41.

The flexible joint 53 further comprises a seal 71 between the circumferential side wall 61 of the ferrule 57 and the hub 59. The seal 71 provides the primary seal against external leakage of liquefied gaseous fuel and fuel vapours. In the arrangement illustrated the seal 71 is configured as an O-ring.

The flexible joint 53 still further comprises a seal 73 within the cavity 67 about the exposed end section 43*a* of the inner tube 43. The seal 73 is adapted for sealing engagement with the exposed end section 43*a* of the inner tube 43, the cavity side wall 68 and the cavity inner wall 69 within the ferrule 57, and the hub 59. In addition to providing as a secondary seal against leakage of liquefied gaseous fuel and fuel vapours, the seal 73 serves to prevent contact between the inner end section of the inner tube 43 which locates against the hub 59 and the surrounding metal outer tube 45 to limit exposure of the fuel to metal. This assists in minimising heat transfer from the liquefied gaseous fuel at this point, as the metal of the outer tube 45 would be more thermally conductive and so contact with the fuel would lead to additional heat loss.

In the arrangement illustrated the seal 73 is configured to present various dedicated sealing faces for sealing engagement with the exposed end section 43a of the inner tube 43, the cavity side wall 68, and the cavity inner wall 69. Typically, the seal 73 in this embodiment would be custom-designed for the purpose.

The seals 71, 73 are adapted to accommodate the angular swinging movement of the tube assembly 41 while maintaining their sealing integrity.

The seal 51 between the outer tube 47 and the injection port 21 is also adapted to accommodate the angular swinging movement of the tube assembly 41 while maintaining its sealing integrity.

From the foregoing, it is evident that the embodiment provides a relatively simple yet highly effective arrangement for accommodating misalignment between the fuel injectors 19, typically rigidly mounted on the fuel rail 17, and the injection ports 21, with any misalignment typically being accommodated by the angular swinging movement of the respective tube assemblies 41.

Figure 3:
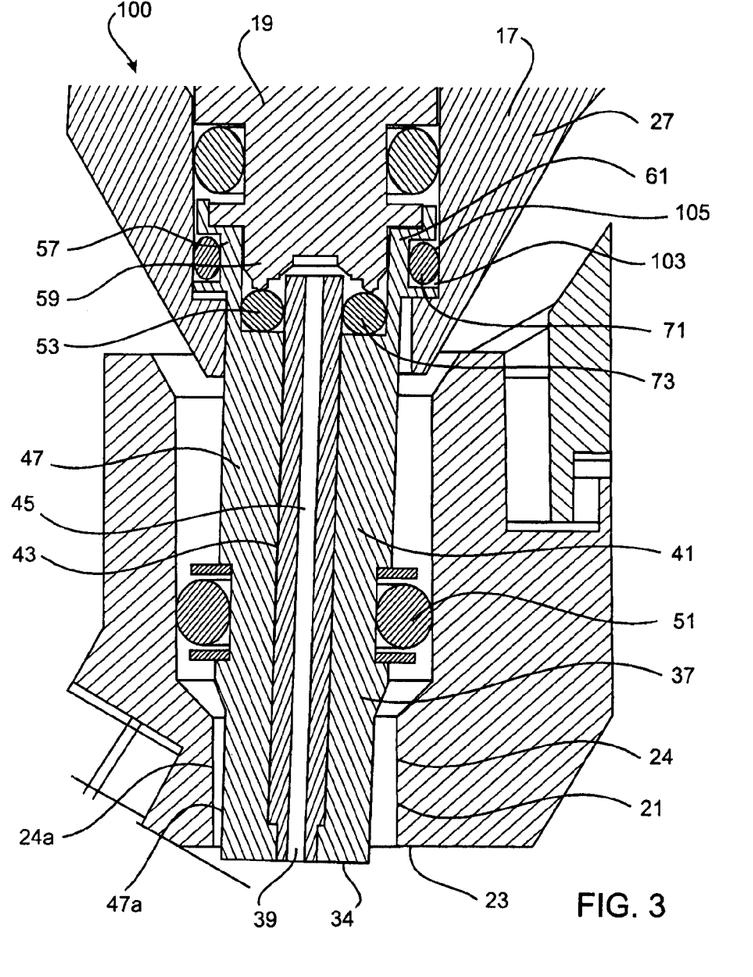
FIG. 3 is a schematic view of an injection system according to a second embodiment.

Referring now to FIG. 3, there is shown an LPI system 100 according to a second embodiment. The LPI system according to the second embodiment is similar to LPI system 10 according to a first embodiment and similar parts are identified by similar reference numerals.

In this second embodiment, the circumferential side wall 61 of the hub 59 locates closely against the hub 59 and incorporates a circumferential outer cavity 103 defining a space 105 in which the primary seal 71 is accommodated for sealing engagement with the adjacent portion of the fuel rail 17.

Additionally, the seal 73 is configured as an O-ring.

Figure 4:
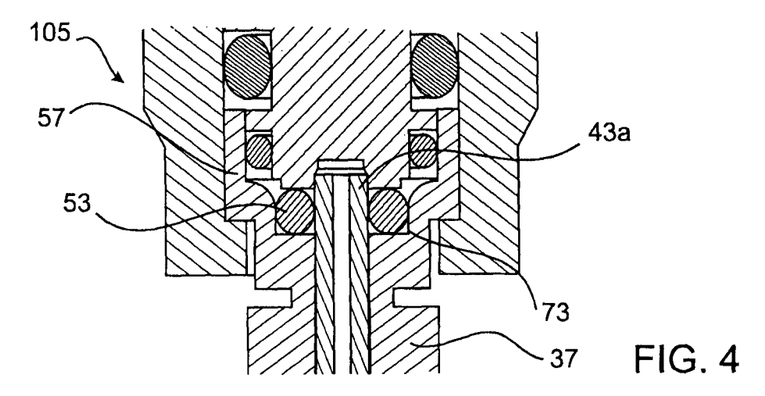
FIG. 4 is a schematic view of an injection system according to a third embodiment.

Referring now to FIG. 4, there is shown an LPI system 105 according to a third embodiment. The LPI system according to the third embodiment is similar to LPI system 10 according to the first embodiment and similar parts are identified by similar reference numerals.

In this third embodiment, the seal 73 is configured as an O-ring for sealing engagement with the exposed end section 43a of the inner tube 43, the cavity side wall 68 and the cavity inner wall 69 within the ferrule 57, and the hub 59.

Figure 5:
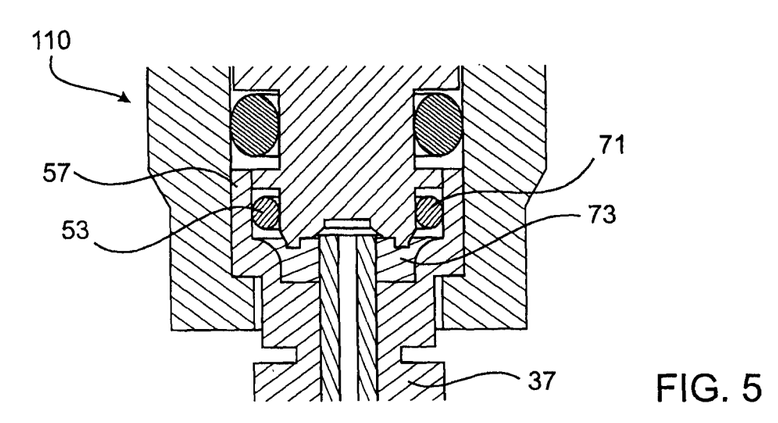
FIG. 5 is a schematic view of an injection system according to a fourth embodiment.

Referring now to FIG. 5, there is shown an LPI system 110 according to a fourth embodiment. The LPI system according to the fourth embodiment is similar to LPI system 10 according to the first embodiment and similar parts are identified by similar reference numerals.

In this fourth embodiment, the seal 73 is configured as an X-ring

Figure 6:
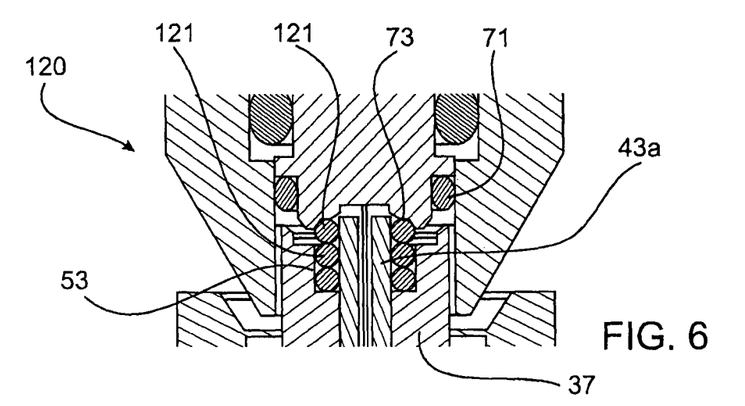
FIG. 6 is a schematic view of an injection system according to a fifth embodiment.
Figure 7:
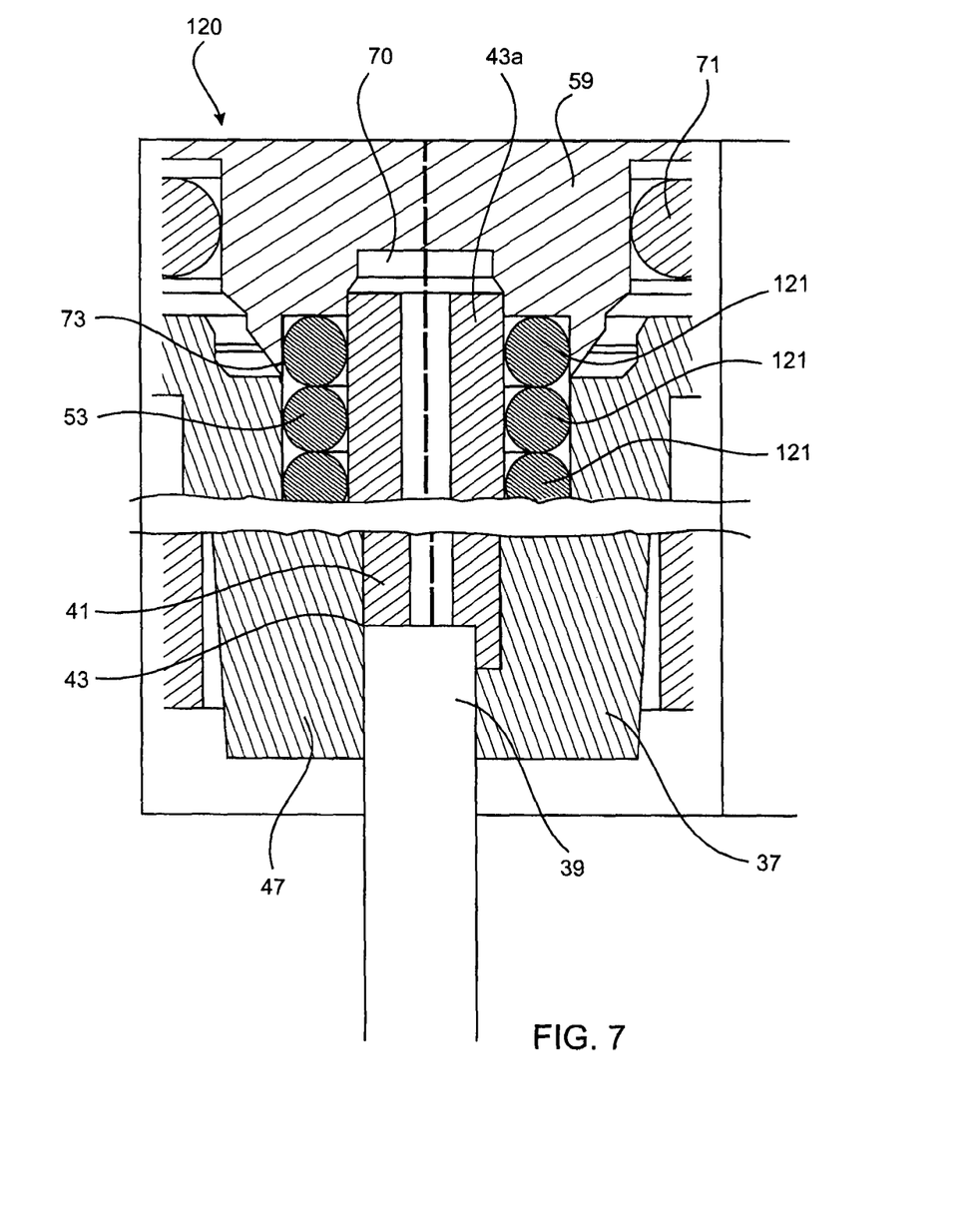
FIG. 7 provides further detail of the arrangement shown in FIG. 6.

Referring now to FIGS. 6 and 7, there is shown an LPI system 120 according to a fifth embodiment. The LPI system according to the fifth embodiment is similar to LPI system 10 according to the first embodiment and similar parts are identified by similar reference numerals.

In this fifth embodiment, the seal 73 comprises a series of individual sealing elements 121. In the arrangement shown, the sealing elements 121 comprise O-rings disposed one adjacent another about the exposed section 43a of the inner tube 43. With this arrangement, the primary seal can accommodate an inner tube 43 of increased wall thickness, and hence larger outside diameter, than the first embodiment. The increased wall thickness of the inner tube 43 offers improved heat insulating characteristics.

In the embodiments previously described, the flexibility to accommodate misalignment between the fuel injectors 19 mounted on the fuel rail 17 and the injection ports 21 was provided by the articular construction of the tube assemblies 41. Other arrangements for accommodating the misalignment are, of course possible. By way of example, the tube assemblies 41 can be constructed to facilitate deformation to accommodate the misalignment. This may be achieved by forming the tube assemblies 41 of an appropriately pliant material. In this regard, it is envisaged that the outer tube 47 would be of a material which is firm yet resiliently flexible. The inner tubes 43 would also need to be flexible, however they are likely to have this characteristic in any event when formed of Teflon tube as previously described.

Additionally, in the embodiments previously described the outer tube 47 of each tube assembly 41 was incorporated in the fuel injector 19. It is possible for the outer tube 47 to be comprised as part of the fuel rail 17.

Figure 8:
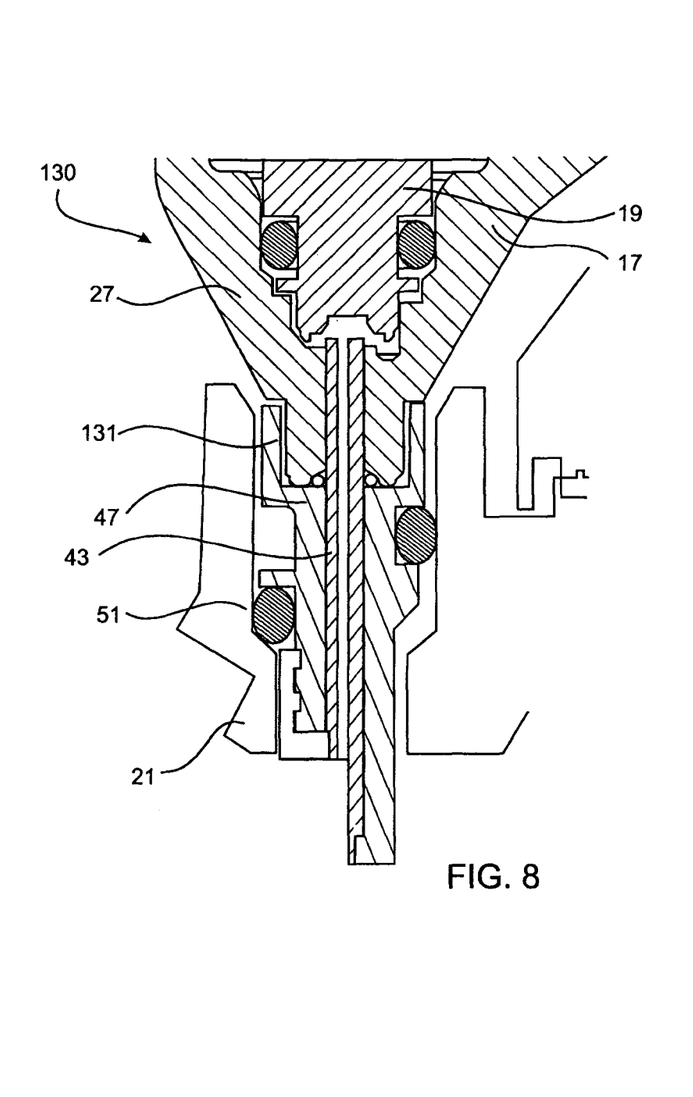
FIG. 8 is a schematic view of an injection system according to a sixth embodiment.

One such arrangement is the LPI system 130 which is the subject of the sixth embodiment shown in FIG. 8. The LPI system 130 according to the sixth embodiment is similar in some respects to previous embodiments and similar parts are, where appropriate, identified by similar reference numerals In this embodiment the outer tube 47 is provided separately of the inner tube 43 and is adapted for connection to the respective injector socket 27. The inner tube 43 is inserted into the outer tube 47 as the injector 19 is installed in the injector socket 27.

In the arrangement shown, the outer tube 47 is attached to the injector socket 27 by a threaded connection 131.

The outer tubes 47 are constructed to facilitate deformation to accommodate misalignment between the fuel rail 17 and the injection ports 21. This may be achieved by forming the outer tubes 47 of an appropriately pliant material. In this regard, it is envisaged that the outer tube 47 would be of a material which is firm yet resiliently flexible for deformation as necessary to accommodate misalignment between the fuel rail 17 and the injection ports 21.

Figure 9:
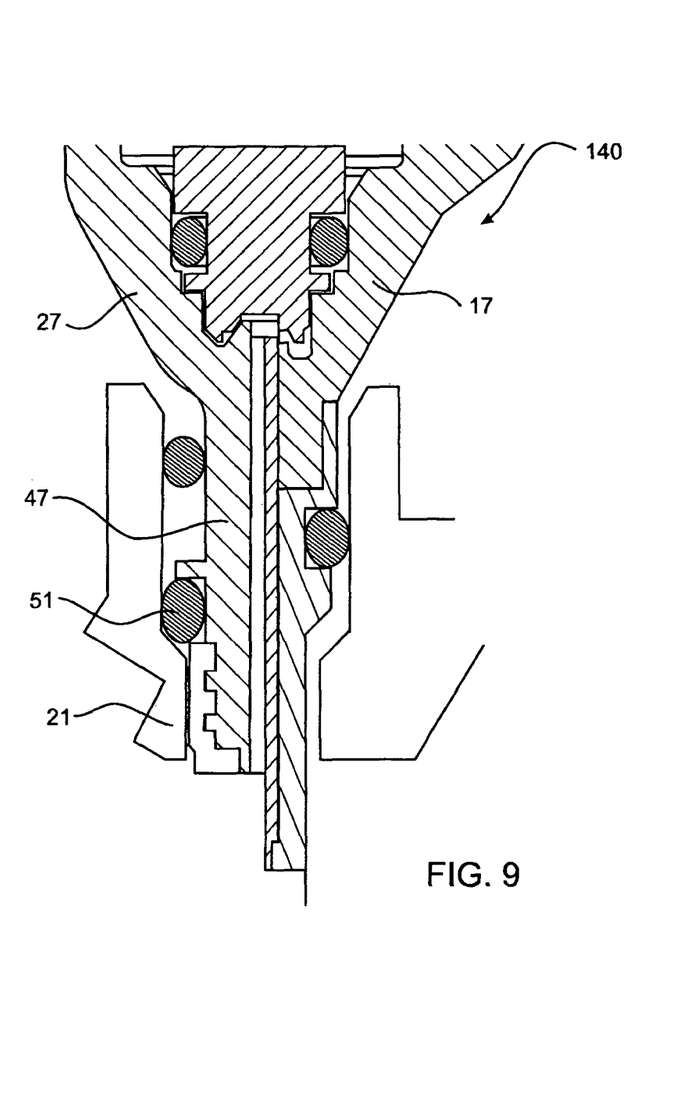
FIG. 9 is a schematic view of an injection system according to a seventh embodiment.

Referring now to FIG. 9, there is shown an LPI system 140 according to a seventh embodiment. The LPI system according to the seventh embodiment is similar to LPI system 130 according to the sixth embodiment and similar parts are identified by similar reference numerals. In this seventh embodiment, the outer tubes 47 are formed integrally with the injector sockets 27 rather than being attached by way of a separation connection. In particular, the outer tubes 47 may be moulded as part of the fuel rail 17.

As will be appreciated from the previous discussion of the different embodiments, the invention finds particularly applicability to any multi-cylinder engine applications where a rigid fuel rail having a plurality of rigidly attached injectors is required to be fitted or connected to a plurality of fixed ports in an intake manifold. This is primarily achieved by the provision of a connecting extension which can be flexibly mounted, such as has been described with reference to the tube assembly 41 in the previous embodiments.

Whilst the invention is particularly suited to multi-cylinder LPI fuel system applications where the current use of side-feed fuel injectors typically necessitates rigid connections to a rigid fuel rail, it is to be appreciated that application of the invention is not limited to such LPI fuel systems alone and has equal applicability to other non-gaseous fuelled multi-cylinder engine applications.

It should be appreciated that the scope of the invention is not limited to the scope of the various embodiments described.

Throughout the specification and claims, unless the context requires otherwise, the word "comprise" or variations such as "comprises" or "comprising", will be understood to imply the inclusion of a stated integer or group of integers but not the exclusion of any other integer or group of integers.

The claims defining the invention is as follows:

1. A fuel injection assembly comprising a fuel injector having an injection outlet, a fuel rail in which the fuel injector is adapted to be supported, a tip, a body portion and a nozzle portion, the tip having an end from which fuel issuing from the outlet of the fuel injector is discharged, the tip being adapted for location in an injection port, the tip being of flexible construction provided by a flexible joint between said body portion and nozzle portions that provides articular movement between said nozzle and body portion to accommodate some misalignment between the fuel rail and the injection port, wherein the fuel injector comprises a side feed injector.

2. The fuel injection assembly according to claim 1 wherein the fuel rail is adapted to support a single fuel injector.

3. The fuel injection assembly according to claim 1 wherein the fuel rail is adapted to support a plurality of fuel injectors in spaced relation.

4. The fuel injection assembly according to claim 1 wherein the tip is of articular construction.

5. The fuel injection assembly according to claim 4 wherein the articular construction comprises a joint between the tip and a part of the fuel assembly to which it is connected.

6. The fuel injection assembly according to claim 4 wherein the articular construction comprises a joint within the tip to permit articulation thereof.

7. The fuel injection assembly according to claim 1, wherein the nozzle portion is configured as an extension to define the tip.

8. The fuel injection assembly according to claim 7 wherein the tip defined by the nozzle portion is adapted to be coupled to the body portion by a flexible joint.

9. The fuel injection assembly according to claim 8 wherein the nozzle portion comprises an inner tube defining a fuel flow path and an outer tube surrounding the inner tube, the inner and outer tubes providing a tube assembly.

10. The fuel injection assembly according to claim 9 wherein the tube assembly is coupled to the injector body by way of the flexible joint.

11. The fuel injection assembly according to claim 10 wherein the flexible joint comprises an inner end portion of the outer tube configured as a ferrule for engagement with a hub on the injector body portion and also for engagement with an injection port in which the fuel injector is adapted to be received.

12. The fuel injection assembly according to claim 11 wherein the ferrule has a circumferential side wall which defines a cavity to receive the hub and a circumferential shoulder for location on a circumferential landing defined by the injection port, the ferrule being adapted to interact with the hub and the circumferential landing in a manner facilitating the angular swinging movement of the tube assembly.

13. The fuel injection assembly according to claim 12 wherein the flexible joint further comprises a first seal between the circumferential side wall of the ferrule and the hub.

14. The fuel injection assembly according to claim 13 wherein the ferrule defines an inner cavity and the inner tube extends through the cavity for fluid communication with the hub to receive liquefied gaseous fuel therefrom and wherein there is provided a second seal within the cavity about the adjacent end section of the inner tube, the second seal being adapted for sealing engagement with the adjacent end section of the inner tube, the ferrule and the hub.

15. The fuel injection assembly according to claim 3 wherein the tip is formed integrally with, or connected to, the fuel rail.

16. A fuel injector for a fuel injection assembly according to claim 1.

17. A system for liquid phase injection (LPI) of gaseous fuels into a multi-cylinder internal combustion engine, the system comprising a fuel injection assembly according to claim 1.

18. The fuel injection assembly according to claim 4 wherein the articular construction comprises a joint between the tip and a part of the fuel assembly to which it is connected.

19. The fuel injection assembly according to claim 4 wherein the articular construction comprises a joint within the tip to permit articulation thereof.

20. A fuel injector having an injection outlet, a body portion, a nozzle and a tip having an end from which fuel issuing from the outlet of the fuel injector is discharged, the tip being adapted for location in an injection port, the tip being of flexible construction provided by a flexible joint between the body portion and the nozzle that provides articular movement between the nozzle and body portions to accommodate some misalignment between a fuel rail, in which the fuel injector is supported and injection port into which the tip is adapted to be sealingly located, and where the fuel injector comprises a side feed injector.

21. A fuel injector according to claim 20 wherein the tip defined by the nozzle portion is coupled to the body portion by a flexible joint.

22. A fuel injector comprising a body portion and a nozzle portion configured to define a tip having an end from which fuel is discharged, the tip being adapted for location in an injection port, the tip being of flexible construction provided by a flexible joint between the body portion and the nozzle that provides articular movement between the nozzle and body portions to accommodate some misalignment between a fuel rail, in which the fuel injector is supported and injection port into which the tip is adapted to be sealingly located, wherein the fuel injector comprises a side feed injector.

* * * * *